United States Patent [19]
Gallardo

[11] Patent Number: 5,957,086
[45] Date of Patent: Sep. 28, 1999

[54] BIRD CAGE

[76] Inventor: Gilberto G. Gallardo, 155 Tasman Pl., San Diego, Calif. 92114

[21] Appl. No.: 09/017,478

[22] Filed: Feb. 2, 1998

[51] Int. Cl.$^6$ .................................................. A01K 31/06
[52] U.S. Cl. ......................... 119/429; 119/432; 119/469; 119/463
[58] Field of Search ................................. 119/429, 432, 119/469, 479, 458, 452, 461, 463, 462

[56] References Cited

U.S. PATENT DOCUMENTS

| | | | |
|---|---|---|---|
| 1,186,782 | 6/1916 | Hercer | 119/469 |
| 1,460,102 | 6/1923 | Leon | 119/469 |
| 1,662,687 | 3/1928 | Tullis | 119/463 |
| 2,765,771 | 10/1956 | Kevorkian | 119/469 |
| 4,572,107 | 2/1986 | Clarizo | 119/463 |
| 4,991,544 | 2/1991 | Galvin et al. | 119/469 |
| 5,088,445 | 2/1992 | Brindamour | 119/469 |
| 5,201,278 | 4/1993 | Hehn | 119/469 |
| 5,694,884 | 12/1997 | Eicoff | 119/469 |

*Primary Examiner*—Jack W. Lavinder
*Assistant Examiner*—Yvonne R. Abbott
*Attorney, Agent, or Firm*—John L. Schmitt

[57] ABSTRACT

A cage particularly adapted for maintaining birds in a residential setting includes an upper enclosure having spaced apart, bar-formed top wall, bottom wall, and sidewalls. Corner posts of the enclosure are carried on corner posts of a caster riding carriage allowing ready cage relocation. Slidably carried by the carriage below the enclosure bottom wall is a bottom tray. The attached to the carriage and positioned about a lower end of the enclosure is a seed deflection screen. This screen includes a set of readily removable side panels having fastening elements that slide into openings in the carriage posts. The deflection screen additionally includes a front and a rear panel having end flanges that slip into channels on ends of the side panels to form interference fits. As carried, bottom edges of the screen panels are positioned to divert any seeds striking the panels into the bottom tray. A front wall of the enclosure includes a hinged door that may be locked shut or maintained closed by a spring biased latch. Sidewalls of the enclosure then have openings fitted with removable bird seed cup holders. Above the enclosure top wall is a slidable top tray located below a bird playground unit. During use the trays and screen panels can be readily removed and cleaned of any collected bird excrement and uneaten food and then returned to the cage.

13 Claims, 6 Drawing Sheets

BIRD CAGE

BACKGROUND OF THE INVENTION

1. Field of the Invention

This invention relates to animal cages and more particularly to a bird cage having a bar-formed enclosure surrounded by a readily removable deflection screen for funneling bird thrown seeds into a removable tray below the enclosure.

2. Prior Art

Cages providing living space for birds in a domestic setting are well known and been in use for any years.

U.S. Pat. No. 99,164 discloses one early bird cage that comprises a base supporting a circular shaped enclosure. Hooks releasably hold the base and enclosure together. Extending outward from about a bottom ring of the enclosure is a cup-shaped seed guard.

A bird cage having an improved seed guard or screen is set out in U.S. Pat. No. 1,186,782. This screen includes a set of four corner sections. Each section has a pair of perpendicularly positioned arms that incline upward and outward. The arms of two sections have bead-formed upper and lower edges that slidably fit into respective upper and lower guide edges of arms of the other sections. To attach the screen to the cage, the lower edges of the section arms first are placed on a peripheral bottom flange of the cage. Then, hooks carried by the screen arms fit over a horizontal bracing strip of an enclosure of the cage.

A still further bird cage seed catch or guard is shown in U.S. Pat. No. 1,460,102 and includes a set of flanges that extend upward and outward from a base pan. Ends of the flanges join to form mitered corners respectively held together by junction plates. As joined, the flanges define an inner, rectangular shaped space for disposition of a cage. Each junction plate includes a slidable finger piece having an offset lower end. These finger piece ends are selectively insertable into respective openings in bottom corners of an enclosure of the cage to attach the enclosure to the base pan and seed guard.

Next, a bird cage having a detachable, frame-shaped seed guard is shown in U.S. Pat. No. 1,662,687. This guard includes upward and outward inclined side and end flanges joining at mitered corners. Bottom edges of the flanges define an inner opening. Upward extending lugs spaced about the flange bottom edges interact with a lower part of an enclosure of the cage to effect alignment therebetween. Hooks, pivotally attached to the respective flanges, then secure the seed guard to the enclosure.

U.S. Pat. No. 4,572,107 discloses a more recent animal cage. This cage includes an upper enclosure having a mesh floor. Located below this floor is a newspaper-lined funnel having a bottom end that fits into a disposable bag carried inside a sack.

Lastly, U.S. Pat. No. 4,991,544 shows a bird cage having a seed guard that includes a set of corner brackets. Each bracket has shallow, V-shaped wings that connect with an offset bottom flange. An expandable slot in this bottom flange fits about respective lower ends of posts of an enclosure of the cage. As fitted, each bracket is supported in an upwardly and outwardly position by a part connecting an upper end of the bracket to the corner post of the enclosure. The guard lastly includes a set of panels sized so that respective ends of the panels fit under retaining flanges on the bracket wings.

SUMMARY OF THE INVENTION

A cage of this invention includes an enclosure particularly adapted for providing domestic living space for birds. The enclosure is carried on a castered carriage and includes corner posts that connect bar-formed vertical walls, a removable bar-formed bottom wall, and a bar-formed top wall. One vertical wall has a framed opening for a hinged door fitted with a spring-activated latch and a key-operated lock. Other vertical walls of the enclosure have openings for removable seed cup holders. The corner posts then extend above the enclosure to carry a bird playground unit. This unit fits over a removable top tray carried on the top wall of the enclosure.

In the carriage below the enclosure bottom wall is a removable bottom tray. Positioned about the enclosure and located between this bottom tray and the enclosure bottom wall is a seed deflection screen. This screen comprises a set of side panels, a front panel, and a rear panel. Each side panel then has a set of spaced apart elements that fasten to sides of the carriage so that the side panels project upwardly and outwardly therefrom. The screen is completed by inserting downward facing flanges on ends of the front and rear panel into upward facing channels on ends of the side panels. As the panels of the seed deflection screen now are located, the bottom edge of each panel is positioned above and in proximate alignment with sides of the bottom tray.

The cage of this invention provides several advantages over other bird cages presently known or in use.

A first advantage is that, as supported on casters, the cage is readily movable to different settings in a household. Such movement facilitates cleaning about the cage and adapting cage location to seasonable changes of incoming sun light.

A second advantage is that tools are not needed to assemble the cage. Additionally, the various components of the cage are held together without use of conventional fasteners.

This no tool required provides a further advantage of ready component removal for cleaning and then reassembly. As appreciated by anyone who has had contact with cage-living birds, there is a continuing need for cleaning.

With respect to cleaning, note first that any droppings or other material release during bird use of the upper playground unit collects in top tray. This top tray may be readily removed, cleaned, and then returned. Next, seeds thrown from the cage by birds therein strike the panels of the deflection screen and funnel into the bottom tray. Additionally this bottom tray catches droppings and others released materials that fall through the bottom wall bars. The bottom wall, deflection screen panels, and bottom tray all may be easily removed from the cage, cleaned, and then returned.

A still further advantage is that cover plates may be readily placed over the seed cup holder openings in vertical walls of the enclosure. For example, a cover plate may be used when a seed cup holder is removed for cleaning or when less than a maximum number of holders is required. These cover plates prevent bird escape.

Lastly, the double lock enclosure door inhibits inadvertent bird release. The key-operated lock prevents door opening by a child or by a bird imitating caretaker operation. Where there is minimal opportunity of a child release, then the easier operated latch typically provides the required security. A bird initiated release of the latch is inhibited by aligning a finger gripping end of the latch handle with one door bar.

DESCRIPTION OF THE PREFERRED EMBODIMENT

Figure 1:
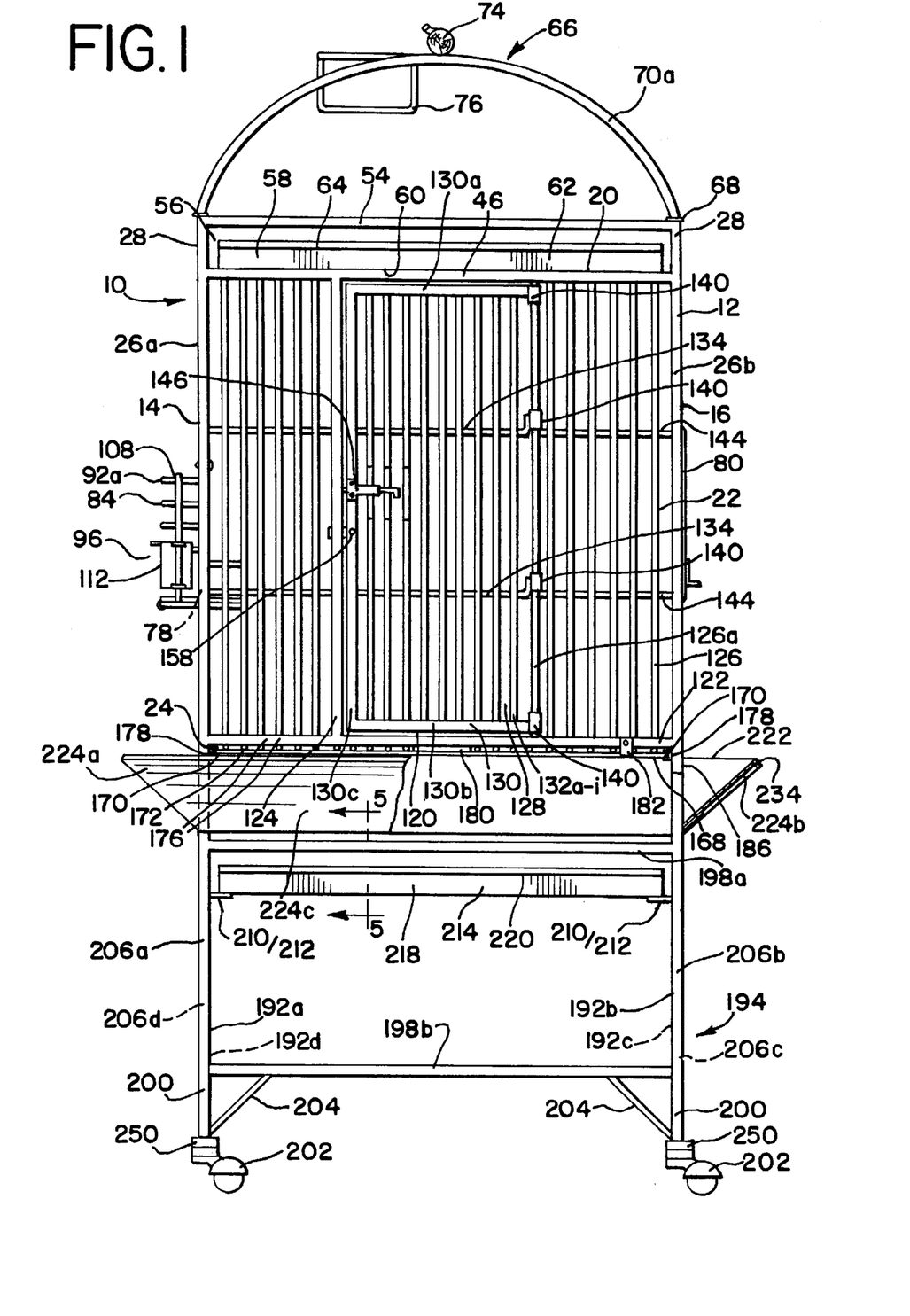
FIG. 1 is an elevational view of a front of a cage of this invention.
Figure 2:
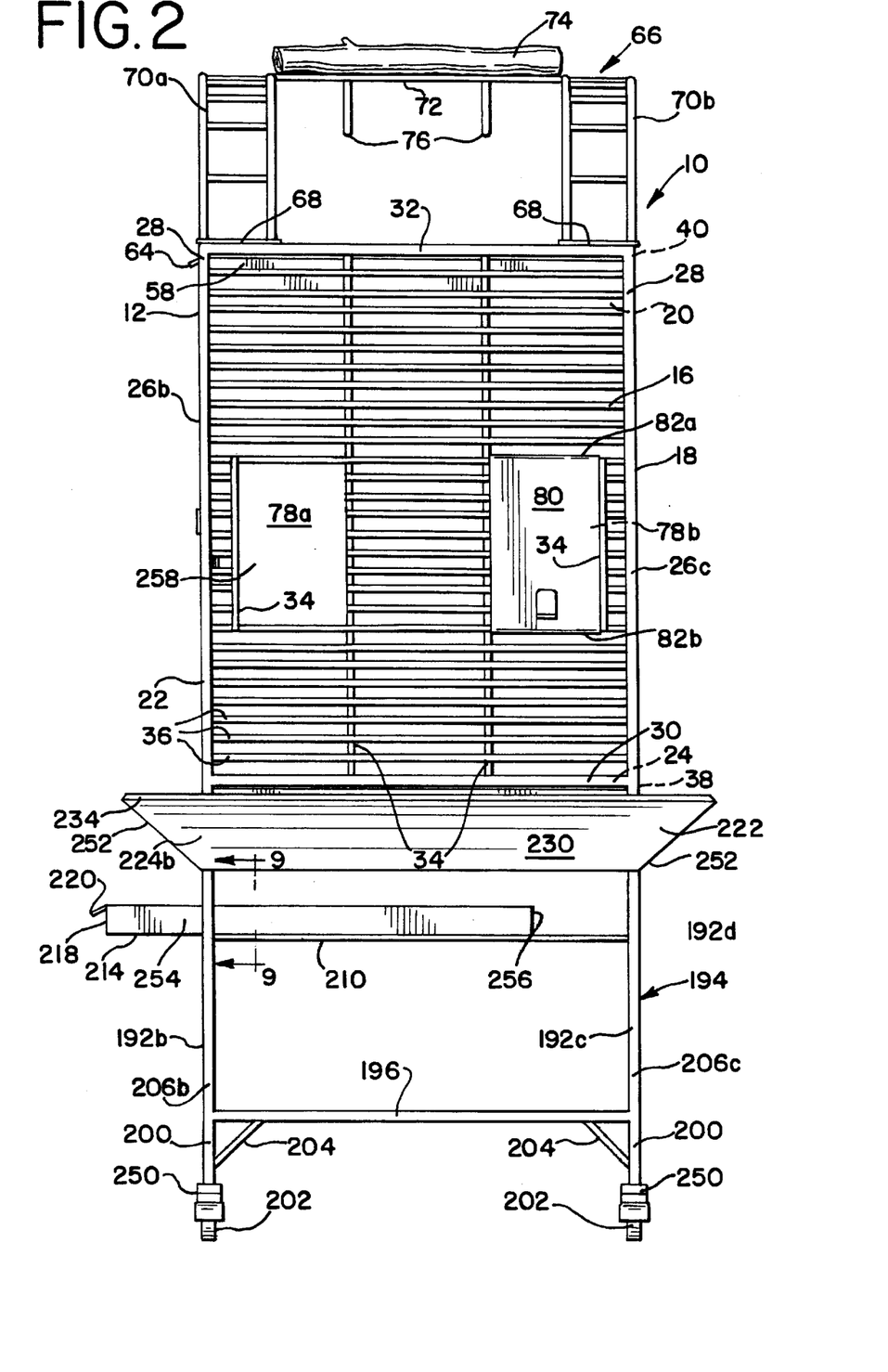
FIG. 2 is an elevational view of one side of the cage.
Figure 3:
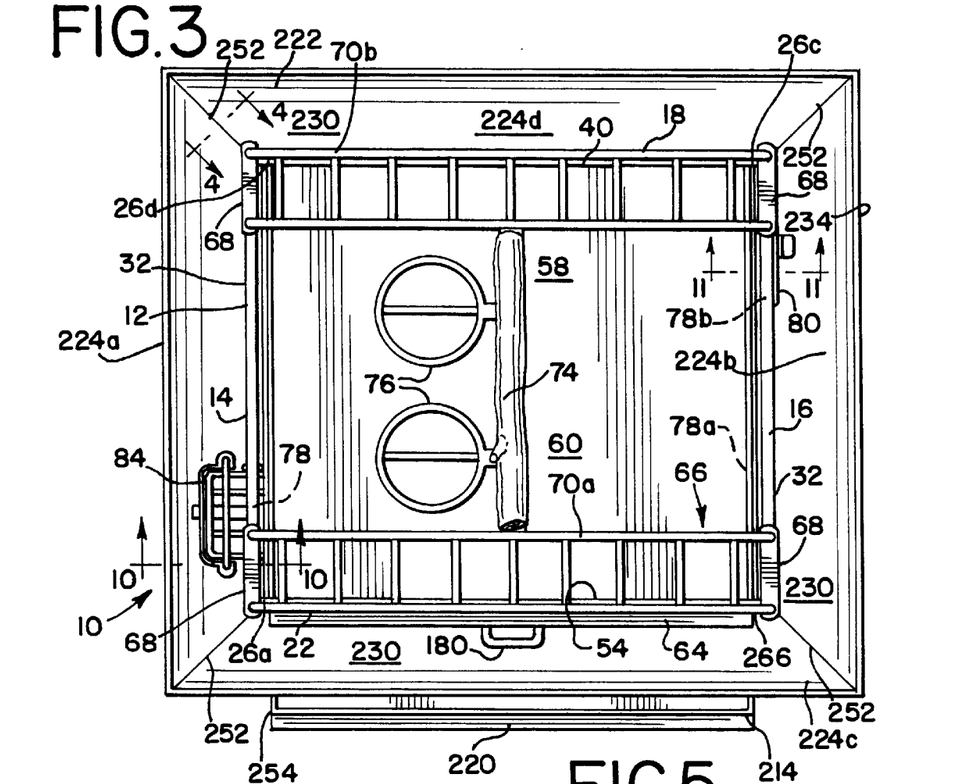
FIG. 3 is a plan view of the cage of FIG. 1 with a bottom tray of the cage shown in a partially withdrawn condition.

A cage of this invention is shown generally in FIGS. 1–3 and designated 10. The cage 10 includes a rectangular shaped enclosure 12 defined by sidewalls 14, 16, a back wall 18, a top wall 20, a front wall 22, and a bottom wall 24. A set of tubular corners posts 26a, 26b, 26c, and 26d connects the walls 14–24 and have top ends 28 that extend above the top wall 20.

Each sidewall 14, 16 comprises bottom and top horizontal frame members 30, 32 having ends attached to the corner posts 26a, 26c and 26b, 28d. A pair of spaced apart, vertically positioned, sidewall spacer bars 34 then extend between the sidewall bottom and top frame members 30, 32. These spacer bars 34 add support to a series of horizontally positioned, spaced apart sidewall enclosure bars 36 having ends attached to the corner posts 26a, 26d and 26b, 26c.

The enclosure back wall 18 includes horizontally positioned bottom and top frame members 38, 40 having ends attached to the corner posts 26c, 26d. A pair of spaced apart, horizontally positioned spacer bars (not shown) then extend between the corner posts 26c, 26d. These back wall spacer bars add support to a series of vertically positioned, spaced apart back wall enclosure bars (not shown) having ends attached to the back wall bottom and top frame members 38, 40.

The top wall 20 includes a horizontally positioned front frame member 46 and a back frame (not shown) having respective ends attached to corner posts 26a, 26b and 26c, 26d. Additionally, the top wall back frame member is attached to the back wall enclosure bars. Then, extending between the top wall front frame member 46 and the top wall back frame member is a set of spaced apart, horizontally positioned top wall enclosure bars (not shown).

As noted above, the top ends 28 of the corner posts 26a, 26b extend above the top wall 20 and are connected by a front wall top frame member 54, see FIG. 1. This front wall frame member 54 is spaced above the top wall front frame member 46 to define a top tray opening 56. A top tray 58 is disposed in this opening 56 with a bottom 60 of the tray 58 slidably resting on the top wall enclosure bars. A front side 62 of the top tray 58 has an outward extending flange that serves as a handle 64.

Located above the top tray 58 is a playground unit 66 having two pairs of support plates 68 that seat respectively on the sidewall top frame members 32. Extending between respective pairs of opposing plates 68 are two arcuate shaped ladders 70a, 70b. A cross member 72 then connects the ladders 70a, 70b and supports a piece of a tree branch 74 and two cup holders 76.

As shown in FIGS. 1–3, a single rectangular shaped opening 78 is formed in the enclosure sidewall 14, and a pair of openings 78a, 78b is formed in the sidewall 16. As seen in FIG. 2 and in greater detail in FIG. 11, a plate 80 covers the sidewall opening 78b. This plate 80 has top and bottom radiused end flanges 82a, 82b that snap over the sidewall enclosure bars 36 forming upper and lower ends of the opening 78b. The opening 78 in the sidewall 14 and the opening 78a in the sidewall 16 are similar. A bird seed cup holder 84 fits in the opening 78 while the opening 78a has been left uncovered as way of example.

Figures 10, 11:
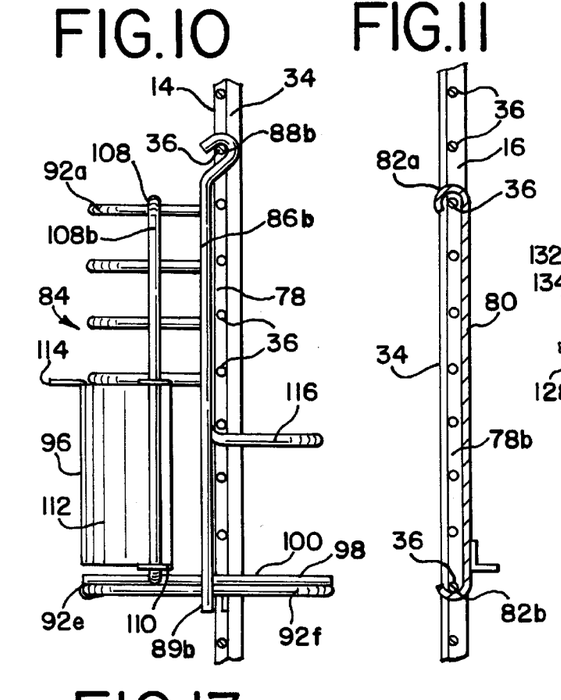
FIG. 10 is a cross-sectional view of a portion a sidewall of the cage enclosure and a side elevational view of an attached bird seed cup holder seen generally along the line 10—10 in FIG. 3.
FIG. 11 is a cross-sectional view of a portion of the enclosure sidewall seen generally along the line 11—11 in FIG. 3.
Figure 12:
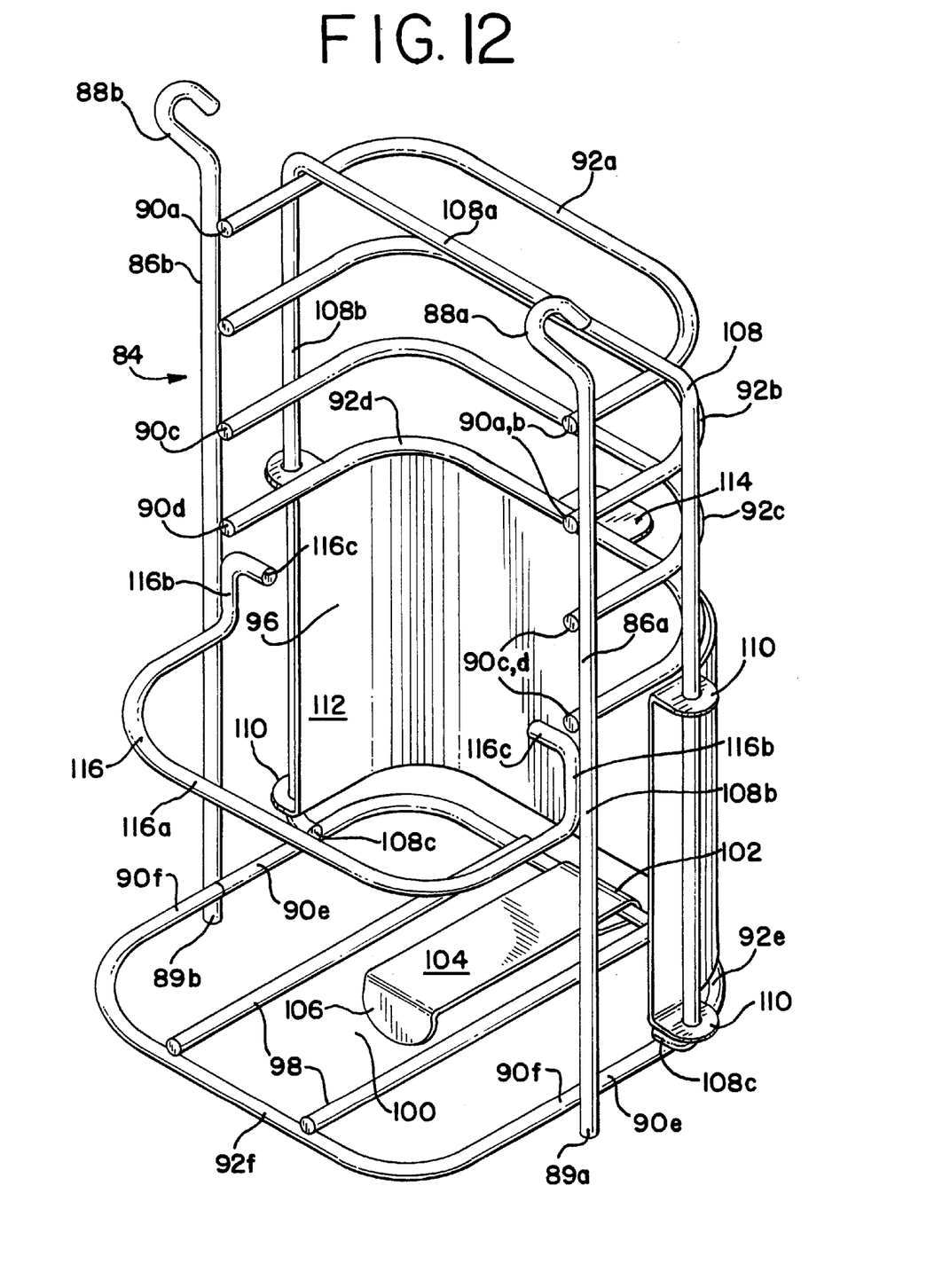
FIG. 12 is a perspective view of the bird seed cup holder seen in FIG. 10.

The cup holder 84 is shown in greater detail in FIGS. 10 and 12 and includes a pair of vertically positioned, spaced apart wire standards 86a, 86b having respective outward facing top hooked ends 88a, 88b. Respective ends 90a–90e of a set of five horizontally positioned, C-shaped cross bars 92a–92e are fastened to the standards 86a, 86b and extend outward therefrom. These outer cross bars 92a–92e are located periodically from below the standard top ends 88a, 88b and above bottom ends 89a, 89b of the standards 86a, 86b. The cross bar 92d is spaced upward from the bottom cross bar 92e to form a seed cup opening 96.

Then, extending inward from the bottom cross bar 92e is an inner bottom C-shaped cross-bar 92f. This inner cross bar 92f is positioned in an opposing manner so that its ends 90f connect with the ends 90e of the bottom outer cross bar 92e. Next, a pair of spaced apart, longitudinally positioned shelf support bars 98 extend between the outer and inner bottom cross bar 92e, 92f to form a seed cup shelf 100. Attached to the inner bottom cross bar 92f between the shelf support bars 98 is a looped end 102 of a locking bracket 104 having an opposite flanged end 106.

The cup holder 84 further includes an inverted U-shaped rod member 108. An upper horizontal section 108a of the member 108 is attached to the uppermost cross bar 92a and connects spaced apart, vertical guide sections 108b. A bottom end 108c of each guide section 108b is inturned and attached to the outer bottom cross bar 92e. Slidably disposed on these member guide sections 108b are respective pairs of tabs 110 of a C-shaped guard plate 112 having an upper edge flange shaped handle 114.

Extending inward from the holder standards 86a, 86b is a cup retaining member 116 having an inward extending C-shaped cross bar 116*a*. Ends of this cross bar 116*a* connect with vertical side segments 116*b* that in turn are attached respectively to the standards 86*a*, 86*b*. Then, joining each vertical side segment 116*b* is a horizontal end segment 116*c* that projects into the cup opening 96.

In the enclosure front wall 22 is a door opening 120 defined by the top wall front frame member 46 and a front wall bottom frame member 122 having ends fastened to the corner posts 26*a*, 26*b*. Sides of the door opening 120 are formed by a door frame vertical member 124 and a front wall side enclosure bar 126*a*. This side enclosure bar 126*a* is one of a series of spaced apart, vertically positioned front wall side enclosure bars 126. These front wall side enclosure bars 126 have ends joining the top wall front frame member 46 and the front wall bottom frame member 122.

Figures 13, 14:
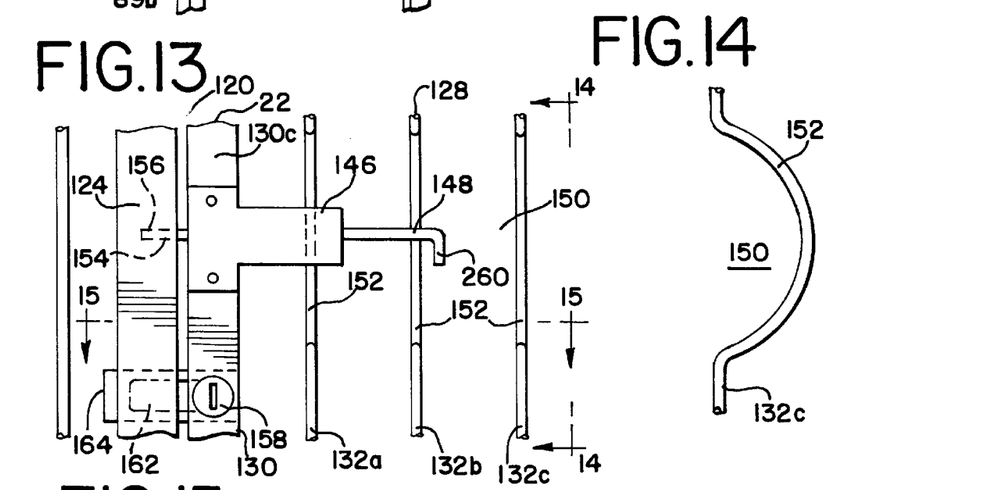
FIG. 13 is an elevational view showing in detail a portion of a front wall and door of the cage enclosure.
FIG. 14 is a side elevational view of the door portion as seen generally along the line 14—14 in FIG. 13.
Figure 15:
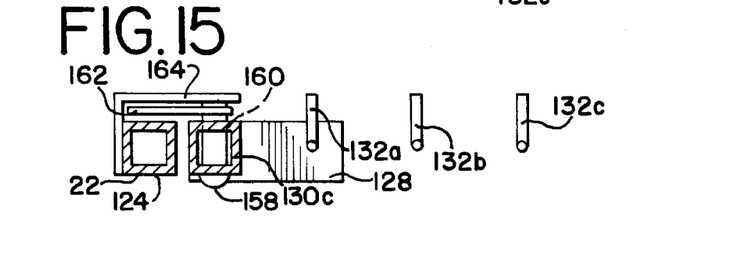
FIG. 15 is a cross section view as seen generally along the line 15—15 in FIG. 13.
Figure 16:
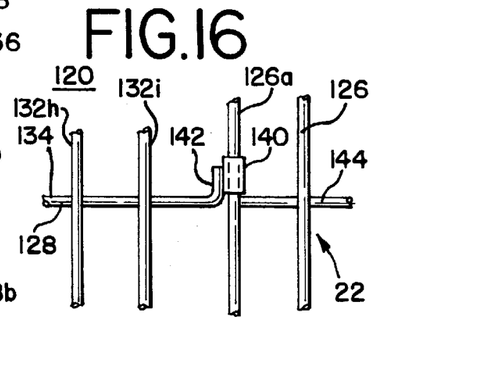
FIG. 16 is an elevational view showing in detail a hinge of the front wall door.

As best seen in FIGS. 1, 13 and 16, a door 128 fits in the door opening 120 and includes a tubular, channel shaped perimeter 130 comprising a top and bottom segment 130*a*, 130*b* that are connected by an outer side segment 130*c*. Extending between the perimeter top and bottom segments 130*a*, 130*b* is a set of nine spaced apart, vertically positioned door enclosure bars 132*a*–132*i*. Then, joined to the perimeter outer side segment 130*c* and the door enclosure bars 132*a*–132*i* is a pair of horizontally positioned, spaced apart door spacer bars 134. On inner ends of each door spacer bar 134 and on inner ends of the door perimeter top and bottom segments 130*a*, 130*b* are sleeves 140. These sleeves 140 pivotally fit about the front wall side enclosure bar 126*a*. As seen in FIG. 16, each door spacer bar 134 has an upturned inner end 142 so that the attached sleeves 140 rests on ends of side spacer bars 144 of the front wall 22.

FIGS. 1 and 13–15 show the door perimeter vertical segment 130*c* fitted with a spring-activated latch 146. A handle 148 of the latch 146 is located in a recess 150 formed by radiused offsets 152 in the door enclosure bars 132*a*–132*c*. A finger pull end 260 of this latch handle 148 proximately aligns with enclosure bar 132*b*. A locking pin 154 of the latch 146 extends through an opening 156 in the door frame vertical member 124. Located below the latch 146 is a key-operated lock 158. This lock 158 is secured in an opening 160 in the door perimeter outer side segment 130*c*. The lock 158 has a locking bolt 162 located between the door frame vertical member 124 and a horizontal leg of an angle bracket 164 attached to the door frame vertical member 124. This bracket 164 covers the lock bolt 162 when this bolt 162 is in a horizontal locking position behind the door frame vertical member 124.

As seen in FIG. 1, the enclosure bottom wall 24 comprises a removable, rectangular shaped wire frame 168. This frame 168 has spaced apart side segments 170 joined by a front segment 172 and a rear segment (not shown). Extending longitudinally between the bottom wall frame front segment 172 and rear segment is a series of spaced apart, horizontally positioned floor bars 176. The side segments 170 of the bottom wall frame 168 are slidably carried by a pair of guide channels 178 attached one each to the sidewall bottom frame members 30. When in a fully inserted position, the bottom wall frame rear segment abuts the back wall bottom frame member 38. Front ends of two centrally located floor bars 176 extend beyond the frame front segment 172 and join to form a handle 180. To maintain this bottom wall frame 168 in its fully closed position, a bottom wall frame retaining bolt 182 is rotatably carried by the front wall bottom frame member 122 to selectively engage the bottom wall frame front segment 172.

Bottom ends 186 of the corner posts 26*a*–26*d* of the enclosure 12 extend below the bottom wall 24. These post bottom ends 186 then fit over inserts 188 in upper ends 190 of a set of tubular corner posts 192*a*–192*d* of a carriage 194. This is shown typically in FIG. 8 where the bottom end 186 of the enclosure corner post 26*b* is partially fitted onto the insert 188 of the carriage corner post 192*b*. The carriage corner posts 192*a*–192*d* are held in a spaced apart relationship by horizontal lower side stretchers 196, horizontal upper and lower front stretchers 198*a*, 198*b*, and a horizontal lower rear stretcher (not shown). A lower end 200 of each post 192*a*–192*d* is fitted with a caster 202. Additionally, angle braces 204 connect each post lower end 200 to the respective lower side stretchers 196, the lower front stretcher 198*a*, and the lower rear stretcher.

Figures 8, 9:
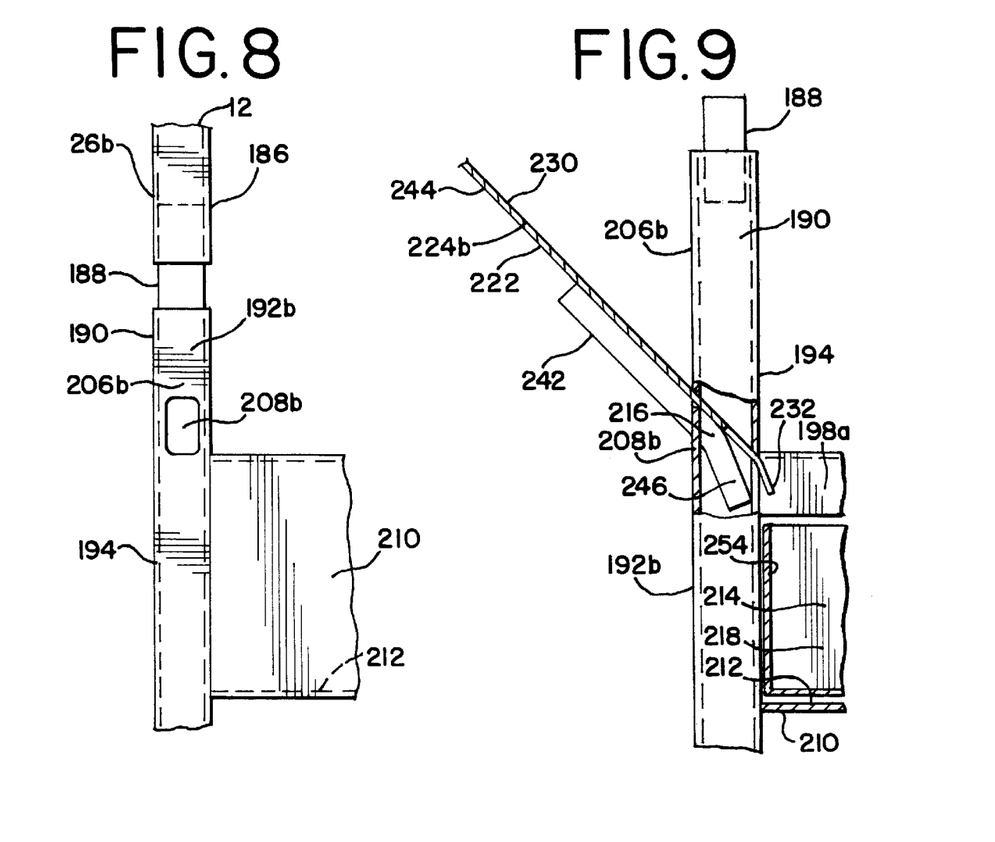
FIG. 8 is a detailed elevational view of a partially formed connection between a corner post of an enclosure of the cage and a corner post of a carriage of the cage with panels of the deflection screen removed.
FIG. 9 is a cross-sectional view of a portion of the cage side as seen generally along the line 9—9 in FIG. 2. Part of the carriage corner post has been cut away to better show a connection between a fastening element of the screen side panel and the corner post.

In respective outer sidewalls 206*a*–206*d* of the carriage posts 192*a*–192*d* are openings 208*a*–208*d*. only one opening, the opening 208*b* in the sidewall 206*b* in the post 192*b* is shown in FIGS. 8 and 9. Below the upper front stretcher 198*a* is a pair of bottom tray side support channels 210 having respective ends attached to the corner posts 192*a*, 192*d* and 192*b*, 192*c*. Each channel 210 has a short upper flange (not shown) that aligns with the corner posts 192*a*, 192*d* and 192*b*, 192*c* and a long lower flange 212 that extends inward from the posts 192*a*, 192*d* and 192*b*, 192*c*. These bottom tray channel lower flanges 212 form a guide for a bottom tray 214. Rearward movement of this bottom tray 214 is limited by a rear channel (not shown) having ends attached to the carriage posts 192*c*, 192*d*. When in a rearward most position, a front wall 218 of the bottom tray 214 is in proximate alignment with the carriage corner posts 192*a*, 192*b* so that a handle 220 integrally formed as part of the bottom tray front wall 218 extends outward therefrom.

Figure 4:
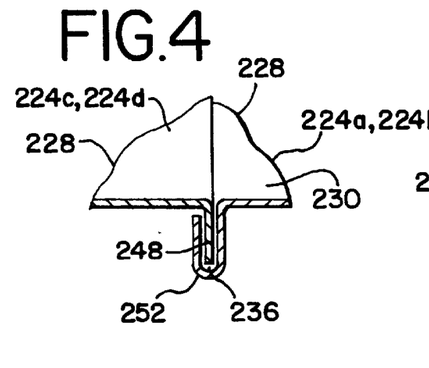
FIG. 4 is a cross-sectional view as seen generally along the line 4—4 in FIG. 3 showing an interference fit between an end of a side panel of a seed deflection screen of the cage and a rear panel of the screen.
Figure 5:
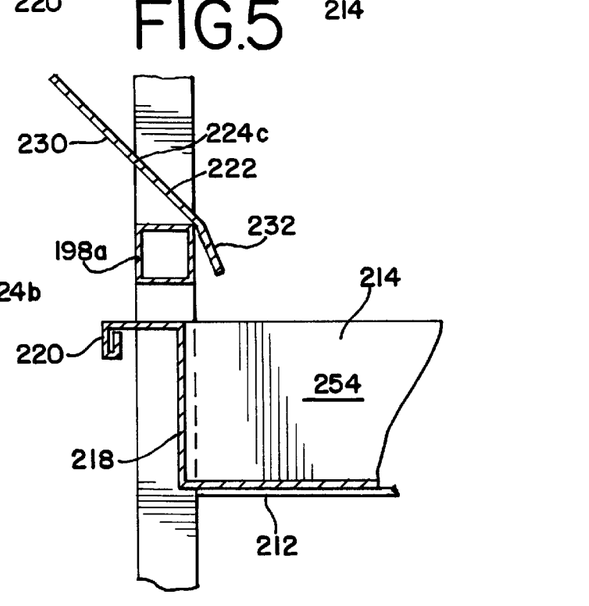
FIG. 5 is a cross-sectional view as seen generally along the line 5—5 in FIG. 1.
Figure 6:
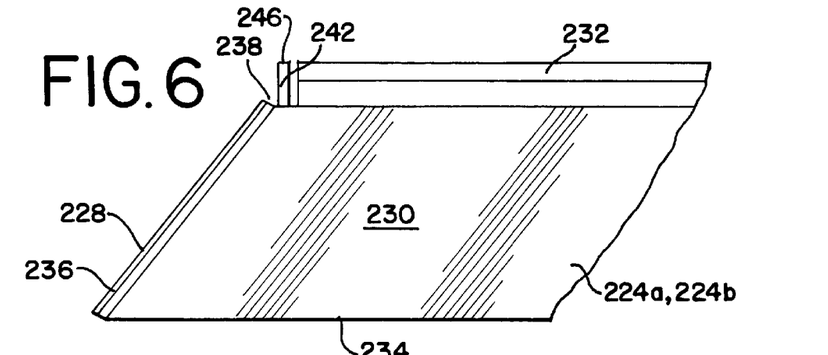
FIG. 6 is a plan view of a mitered end of one side panel of the cage seed deflection screen.
Figure 7:
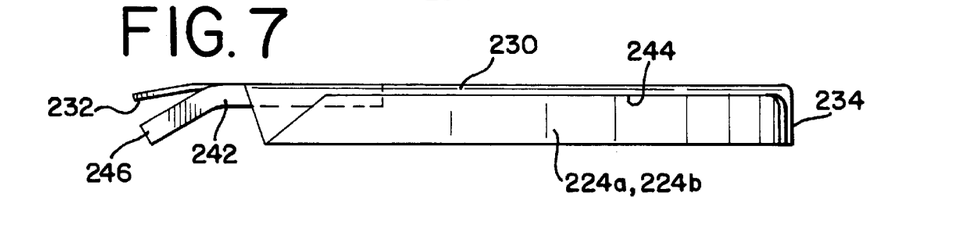
FIG. 7 is an end elevational view of the side panel of FIG. 6.

As seen in FIGS. 1–3, the cage 10 additionally includes a seed deflection screen 222 comprising a pair of side panels 224*a*, 224*b*, a front panel 224*c*, and a rear panel 224*d*. Each panel 224*a*–224*d* has an elongated body 230 formed with an angularly offset bottom flange edge 232 and a perpendicularly positioned top flange edge 234, see FIGS. 5–7. FIG. 6 shows one end 228 of the side panels 224*a*, 224*b*. Each panel end 228 is mitered so that each panel bottom edge 232 is shorter than its top edge 234. Then, as seen typically in FIG. 4, each side panel mitered end 228 has an upward facing channel 236. This channel 236 extends from the panel top edge 234 to an end cutout 238 in the bottom edge 232. This contrasts with the mitered ends 228 of the front and rear panels 224*c*, 224*d* that are formed having downward extending flanges 248.

A body of a fastening element 242 is attached to a bottom side 244 of each side panel body 230 next to its respective end cutout 238. Offset ends 246 of respective fastening elements 242 then extend into these side panel cutouts 238, see FIG. 6.

The cage 10 is shipped in a carton. This carton is smaller than an assembled cage 10 because the enclosure 12 is rotated 90 deg. to nest in part inside the upper ends 190 of the carriage posts 192*a*–192*d*. The enclosure top tray 58, the enclosure bottom wall frame 168, and the carriage bottom tray 214 are shipped in place. However, the playground unit 66 and casters 202 are shipped loose.

To assemble the cage 10, first a post (not shown) of each caster 202 is fitted in a known manner into an opening in an insert 250 disposed in the lower end 200 of each carriage corner post 192*a*–192*d*. Next, the enclosure 12 is attached to the carriage 194 by sliding respective bottom ends 186 of the enclosure corner posts 26*a*–26*d* onto the inserts 188 affixed to the upper ends 190 of the carriage corner posts 192*a*–192*d*.

Then, the cage seed deflection screen 222 is attached to the carriage 194. Attachment begins by sliding the offset ends 246 of the fastening elements 242 of one side panel, for example side panel 224b, into the openings 208b, 208c in the outer sidewalls 206b, 206c of the carriage corner posts 192b, 192c to form slip connections 216, see FIG. 9. The other screen side panel 224a is attached to the carriage posts 192a, 192d in a like manner. As also shown typically in FIG. 9, the side panels 224a, 224b slope upwardly and outwardly as attached.

Next, the front panel and rear panel 224c, 224d of the screen 222 are secured to the side panels 224a, 224b. The flanges 248 on the ends 228 of the front and rear panels 224c, 224d are inserted into the respective side panel end channels 236, shown typically in FIG. 4, to form respective interference fits or connections 252 therebetween. As carried by the side panels 224a, 224b, the front and rear panels 224c, 224d slope upwardly and outwardly in a like manner, see FIG. 4.

As the screen side panels 224a, 224b are positioned, the side panel bottom edges 232 align with sidewall 254 of the bottom tray 214, shown typically FIG. 9. Additionally, the bottom edge 232 of the screen front panel 224c locates inside the bottom tray front wall 218, see FIG. 5. While not shown, the bottom edge 232 of the screen rear panel 224d aligns with a rear wall 256 of the bottom tray 214. Alignment of the panel bottom edges 232 with the respective walls 218, 254, and 256 of the bottom tray 214 is made possible by the clearance provided by the panel bottom edge end cutouts 238. These panel cutouts 238 allow the body 230 of each panel 224a–224d to fit tightly against the carriage posts 192a–192d.

Assembly continues by fitting a seed cup holder 84 in each opening 78, 78a in the enclosure sidewall 14, 16. To effect attachment the holder 84, for example in the opening 78 in the sidewall 14, is positioned on an angle to the enclosure sidewall 14. As then located, the hooked ends 88a, 88b of the holder standards 86a, 86b can be fitted onto the sidewall enclosure bar 36 just above the bar 36 forming the top end of the opening 78. The holder 84 then is lowered until bottom ends 89a, 89b of the standards 86a, 86b engage the enclosure bar 36 forming a bottom of the sidewall opening 78. Lastly, the holder 84 is secured in place by snapping the flanged end 106 of the locking bracket 104 over the sidewall opening bottom enclosure bar 36. A further cup holder 84 then is fitted into the sidewall opening 78a and the plate 80 over opening 78b in the sidewall 16.

Lastly, the support plates 68 of the playground unit 66 are attached to the respective top frame members 32 of the enclosure sidewalls 14, 16.

The ready assembly of the cage 10 described above also facilitates selective disassembly for cleaning. First, using the handle 64, the top tray 58 may be removed and cleaned of any droppings from birds using the playground unit 66. This also is true for the playground unit 66, but the unit 66 requires less frequent cleaning. Also, food cups placed in the unit cup holders 76 may be removed as desired.

Next, individual bird seed cup holders 84 may be unhooked from the enclosure sidewalls 14, 16 after release of the locking bracket 104 from the opening bottom enclosure bar 36. The released holder 84 then may be cleaned and returned. When a cup holder 84 is withdrawn, the now uncovered sidewall opening 78 or 78a may be closed with a cover plate 80 to prevent escape of any birds in the enclosure 12.

For refilling a seed cup held by the holder 84, the guard plate 112 is raised using the plate handle 114 to uncover the cup opening 96. With the seed cup removed, the guard plate 112 then lowered to its closing location. Next, the now refilled cup can be returned to holder 84 by again uncovering the opening 96 and placing the cup on the holder seed cup shelf 100. As located, upward and inward movement of the seed cup is inhibited by engagement of the cup with the cup retaining element cross bar 116a and end segments 116c.

The enclosure sidewall openings 78, 78a, 78b are sufficiently large for insertion of one's hand and arm to remove any large pieces of debris from an interior 258 of the enclosure 12. Alternately, the door 128 may be unlocked using a key to turn the bolt 162 of the lock 158 to align the bolt 162 with the door perimeter side segment 130c. Then, gripping the latch handle finger pull 260 and pulling on the latch handle 148 out removes the locking pin 154 from the opening 156 in the door frame vertical member 124 to release the door 128 for opening. Note that the recess 150 in the door 128 provides clearance for latch handle movement. Further, initial alignment the latch handle finger pull 260 with the door enclosure bar 132b makes movement of the latch handle 148 from within the enclosure interior 258 most difficult. The now opened door 128 provides ready access to the interior 258 of the enclosure 12.

Next, the bottom wall frame 168 may be removed by first rotating the bottom wall bolt 182 to a nonengaging location with the bottom wall frame front segment 172. Then, using the bottom wall frame handle 180, the bottom wall frame 168 may be withdrawn and cleaned. As seen in FIG. 1, the bottom wall frame 168 is located above the top edge 234 of the screen front panel 224c. When the bottom wall frame 168 is removed, care must be taken to prevent escape of small birds through a now open space between the bottom frame members 30, 38, and 122 of the enclosure 12 and the screen 222.

Panels 224a–224d of the seed deflection screen 222 may be removed for cleaning using a reversal of the steps of assembly described above and then reattached using that procedure. Note that the screen panels 224a–224d require infrequent cleaning because panel configuration provides an unobstructed guide path for debris to slide into the bottom tray 214. When screen disassembly and reassembly is required, this may be accomplished without use of tools.

Next, using the bottom tray handle 220, the bottom tray 214 may be slid from the carriage 194 and cleaned of droppings and other debris that has fallen through the floor bars 176 of the bottom wall frame 168 and material striking by the screen panels 224a–224d and then funneling into the bottom tray 214.

Lastly, the entire cage 10 may be relocated by rolling the cage 10 to a different location on its casters 202. Such relocation allows cleaning the cage area and for seasonal changes in sunlight.

While an embodiment, uses, and advantages of this invention have been shown and described, it should be understood that this invention is limited only by the scope of the claims. Those skilled in the art will appreciate that various modifications or changes may be made without departing from the scope and spirit of the invention, and these modifications and changes may result in further uses and advantages.

What I claim is:

1. A cage particularly adapted for bird habitation, said cage comprising:

a set of posts, an enclosure having bar-formed walls carried in a spaced apart relationship by said posts, a removable container carriable by said cage below a bottom wall of said enclosure walls, a first and a second side panel of a seed deflection screen, said side panels having elements for forming slip connections with respective sides of said cage to align ends of said side panels with said posts, carry said side panels in an upward and outwardly extending position, form a space between respective ends of said side panels, and position bottoms edges of said side panels so that debris striking said side panels flows into said container, a front and a rear panel of said seed deflection screen, said front and rear panels having ends forming interlocking connections with said ends of said side panels to carry said front panel in alignment with a front wall of said enclosure walls and said rear panel in alignment with a back wall of said enclosure walls, position said front and rear panel in said upward and outwardly extending position, and position bottom edges of said front and rear panels so that debris striking said front and rear panels flows into said container, and each said end of said side panel having a cutout, and said elements being attached to a body of said side panel to extend respectively into said panel end cutouts, wherein said cage is placed in a bird inhabitable condition by placing said container in said cage below said bottom wall of said enclosure, securing said side panel elements to said cage sides, placing said front and rear panels in said spaces between said side panel ends, and joining ends of said side panels and said ends of said front and rear panels with said cage side-deflection screen side panel slip connections being formed by fitting said elements into openings in adjacent posts.

2. A cage as defined by claim 1 and further characterized by, an upward facing channel formed on said each end of said side panels, and a downward facing flange formed on each end of said front and rear panel, wherein said front and rear panel flanges fit into said side panel channels to form said interlocking connections.

3. A bird cage comprising:

a movable carriage having a set of carriage corner posts, an enclosure having spaced apart bar-formed walls connected by a set of enclosure corner posts carried on said carriage corner posts, a bottom tray slidably carried by said carriage below a bottom wall of said enclosure walls, a seed deflection screen including a pair of side panels having fastening elements respectively fitting in openings in said carriage corner posts to proximately align a bottom edge of each said side panel with a respective sidewall of said bottom tray and locate said side panels in an upward and outward extending position on opposite sides of said cage, and a front and a rear panel having end flanges respectively fitting in channels on ends of said side panels to proximately align a bottom edge of said front panel and said rear panel respectively with a front wall and a rear wall of said bottom tray and locate said front and rear panel in said upward and outward extending position, said enclosure posts having top ends extending above a top wall of said enclosure walls, a pair of frame members carried by said enclosure corner post top ends, a removable top tray carried by said enclosure above said enclosure top wall, and a playground unit carried by said top frame members above said top tray, wherein said screen panels deflect debris and the like from birds in said enclosure into said bottom tray and droppings from birds using said playground unit collect in said top tray.

4. A cage as defined by claim 3 and further characterized by said playground unit including, a pair of spaced apart, arcuate shaped ladders carried by said top frame members, a cross member connecting said ladders, a tree branch attached to said cross member, and a cup holder attached to said cross member, wherein said ladders and said tree branch provide recreation for birds using said playground unit, and said cup holder may retain a food or water carrying container for said birds.

5. A cage as defined by claim 3 and further characterized by, a sidewall of said enclosure walls having an opening, and a bird seed cup holder fitting in said opening, said holder including a pair of spaced apart standards having upper hooked ends looping over a bar of said enclosure sidewall and bottom ends seated against a further bar of said enclosure sidewall, wherein said bird seed cup holder may be readily unhooked from said enclosure sidewall, cleaned, and reattached thereto.

6. A cage as defined by claim 5 and further characterized by said bird seed cup holder including, a set of horizontally positioned, spaced apart cross bars having ends attached to said standards, said cross bar set including a bottom outer cross bar spaced below an above cross bar to form a seed cup opening therebetween and a bottom inner cross bar having ends attached to said standards to form a shelf with said outer bottom cross bar, a guard plate slidably attached to guide sections of a rod member carried by said cup holder, a cup retaining member having side segments attached to said standards, end segments connecting respectively to said side segments to project into said cup opening, and a cross bar connecting with said side sections above said shelf, and bracket means carried by said holder to hold said standard bottom ends against said enclosure sidewall, wherein upward movement of said guard plate provides access to said seed cup opening from placement of a seed cup on said shelf with further movement of said cup being limited by said cup retaining member end segments and cup retaining member cross bar.

7. A cage as defined by claim 3 and further characterized by said enclosure walls including a front wall comprising, a door opening, a door fitting in said opening, said door having a channel shaped perimeter defined by spaced apart top and bottom segments connected by a side segment, a series of vertically positioned, spaced apart door enclosure bars having ends attached to said perimeter top and bottom segments, a pair of horizontally positioned, spaced apart door spacer bars attached to said door perimeter side segment and said door enclosure bars, and sleeves attached one each to ends of said perimeter top and bottom segments and to ends of said door spacer bars, a vertically positioned, front wall side enclosure bar carried by said front wall with said door sleeves pivotally disposed on said front wall side enclosure bar, and a pair of horizontally positioned, spaced apart front wall side spacer bars carried by said front wall and having ends attached to said front wall said enclosure bar with said door spacer bar sleeves seated on said front wall side spacer bar ends, wherein the vertical position of said door within said door opening is maintained by said engagement between said door spacer bar sleeves and said front wall side spacer bars.

8. A cage as defined by claim 7 and further characterized by said front wall including, an inward extending recess formed in said door enclosure bars, a spring-activated latch carried by said door perimeter side segment with a handle of said latch positioned in said door enclosure bar recess and a finger pull end on said latch handle in proximately aligned with one said door enclosure bar, wherein said door enclosure bar recess provides ready access for movement of said latch handle and said latch handle finger pull alignment inhibits inadvertent latch handle movement from within said enclosure.

9. A cage as defined by claim 7 and further characterized by said enclosure front wall including, a key-operated lock carried by said door, and a bracket carried by a vertical member of said door opening, said bracket positioned to cover a bolt of said lock with said bolt in a locking position behind said door opening vertical member, wherein closure of said door may be secured by said key-operated lock.

10. A cage comprising:

a movable carriage having a set of corner posts maintained in a spaced relationship by stretchers extending between said posts, an enclosure having a set of corner posts releasably carried by said carriage posts, said enclosure posts maintained in a spaced relationship by bar-formed walls defining an interior of said enclosure, a playground unit carried by said enclosure above a top wall of said enclosure walls, a top tray removably carried by said enclosure above said top wall and below said playground unit, seed cup holders having upper ends releasably carried by enclosure bars of sidewalls of said enclosure walls to fit in openings in said sidewalls, a door fitting in an opening of a front wall of said enclosure walls, said door having a set of spaced apart sleeves pivotally carried by a vertical side enclosure bar of said front wall and maintained in a fixed vertical location by front wall side spacer bars attached to said front wall side enclosure bar, latching means to maintain said door in a closed position and provide ready release of said door to an open position, and locking means to provide selective release of said door from said closed position, a bottom tray removably carried by said carriage below a bottom wall of said enclosure walls, and a seed deflection screen carried by said carriage, said screen including a pair of side panels having fastening elements inserted in openings in said carriage posts to locate said side panels in respective alignment with said enclosure sidewalls, locate said side panels in an upward and outward extending position, and locate bottom edges of said side panels in proximate alignment with respective sidewalls of said bottom tray, a front panel having respective end flanges fitting in a channel on an end of each said side panel to locate said front panel in said upward and outward extending position and locate a bottom edge of said front panel in proximate alignment with a front wall of said bottom tray, and a back panel having respective end flanges fitting in a channel on an opposite end of each said side panel to locate said back panel in said upward and outward extending position, and locate a bottom edge of said back panel in proximate alignment with a rear wall of said bottom tray, and a bottom wall of said enclosure walls, said bottom wall including a removable bar-formed frame located above a top edge of said screen front panel, wherein said top tray, said bottom tray, said screen panels, and said bottom wall frame may be readily disassembled from said cage for cleaning and then reassembled thereto.

11. A cage particularly adapted for bird habitation, said cage comprising:

an enclosure, a removable container carried by said cage below a bar formed bottom wall of said enclosure, a first side panel of a seed deflection screen extending about said enclosure, said first side panel joined to a first side of said cage by a first quick-release slip connection that independently supports said first side panel in an upward and outwardly extending position and locates a bottom edge of said first side panel to direct debris striking said first side panel into said container, a second side panel of said seed deflection screen joined to a second side of said cage by a second quick-release slip connection that independently supports said second side panel in an upward and outwardly extending position and locates a bottom edge of said second side panel to direct debris striking said second side panel into said container, and a front and a rear panel of said seed deflection screen, said front and rear panels positioned respectively between respective ends of said side panels, and said front and rear panels having respective ends joined to said side panel ends by quick-release interlocking connections that independently support said front and rear panel in said upward and outwardly extending position and locate bottom edges of said front and rear panels to direct debris striking said front and rear panels into said container, wherein during cleaning of said cage integrity of said enclosure is uninterrupted during removal of said container, and cleaning of said cage is facilitated by independent support of said deflection screen side panels through said quick-release slip connections and by independent support of said front and rear panels through said quick-release interlocking connections that allow individual panel removal and reattachment.

12. A cage as defined by claim 11 and further characterized by said enclosure including a front wall comprising, a door opening defined in part by a door frame vertical member and a vertical front wall side enclosure bar, and a door fitting in said door opening and pivotally carried by said vertical front wall side enclosure bar, said door having a channel shaped perimeter defined by spaced apart top and bottom segments connected by a side segment positioned adjacent to said vertical door frame member.

13. A cage as defined by claim 12 and further characterized by said front wall door including, a series of spaced apart vertical door enclosure bars portioned between said door top and bottom segments, a recess formed in said door enclosure bars adjacent to said door side segment, and a spring-activated latch carried by said door side segment with a handle of said latch positioned in said door enclosure bar recess.

* * * * *